United States Patent
Nagano

[11] Patent Number: 5,888,576
[45] Date of Patent: Mar. 30, 1999

[54] EDIBLE SHRIMP PRODUCT AND METHOD OF MAKING

[75] Inventor: Kiyoshi Nagano, Tokyo-to, Japan

[73] Assignee: Nissho Iwai Corporation, Japan

[21] Appl. No.: 793,837

[22] PCT Filed: Jul. 11, 1996

[86] PCT No.: PCT/JP96/01936

§ 371 Date: May 6, 1997

§ 102(e) Date: May 6, 1997

[87] PCT Pub. No.: WO97/02761

PCT Pub. Date: Jan. 30, 1997

[30] Foreign Application Priority Data

Jul. 11, 1995 [JP] Japan .................................. 7-207300

[51] Int. Cl.[6] .................................................. A23L 1/33
[52] U.S. Cl. ........................ 426/643; 426/518; 426/524
[58] Field of Search ..................... 426/643, 518, 426/524

[56] References Cited

U.S. PATENT DOCUMENTS

| 1,906,375 | 5/1933 | Grande | ................................. 426/643 |
| 3,780,196 | 12/1973 | Domecki . | |
| 4,987,644 | 1/1991 | Marion . | |

FOREIGN PATENT DOCUMENTS 62-25007  6/1987  Japan .

*Primary Examiner*—Helen Pratt
*Attorney, Agent, or Firm*—Ostrolenk, Faber, Gerb & Soffen, LLP

[57] ABSTRACT

An edible prawn wherein each of the abdominal carapaces connecting respective ends of the lateral carapaces in the first to fifth abdominal somites and a part of the sixth abdominal somite has been broken along at least one cut, thus facilitating the separation of the meat from the shell like the separation of the telson from the uropod.

6 Claims, 5 Drawing Sheets

EDIBLE SHRIMP PRODUCT AND METHOD OF MAKING

TECHNICAL FIELD

The present invention relates to an edible shrimp product and a process for cooking the edible shrimp product and particularly, to an edible shrimp product and a process for cooking the edible shrimp product in which the shell of the edible shrimp can be simply and easily peeled off without injuring the external appearance of the shrimp.

BACKGROUND ART

The shrimp is generally cooked in a shell-peeled off state, but even if the shrimp has been cooked in a shelled state, it is eaten with its shell peeled off. When the shrimp is eaten, it is essential to remove the shell from the shrimp. In peeling-off the shell from the shrimp, the peeling-off is performed manually in such a manner that an abdominal segment side carapace which is an outer shell of each abdominal or ventral segment is peeled off from the abdomen side.

However, the peeling-off of a tail of shrimp is performed by peeling-off six abdominal segment-side carapaces of first to sixth abdominal or ventral segments. In this case, even if adjacent two abdominal segment side carapaces are peeled off at one time in order to the six abdominal segment side carapaces of the first to sixth abdominal segments, the operation for peeling off the abdominal segment side carapaces must be repeated three times. However, in practice, the abdominal segment side carapace of the sixth abdominal segment is affixed to a tail segment-side shell which is an outer shell of a tail segment and difficult to peel off. For this reason, only the abdominal segment side carapace of the sixth abdominal segment is peeled off separately and hence, one separately peeling-off labor is required. That is, a total of four shell peeling-off operations are required for the shell peeling-off of a tail of shrimp.

Such a shell peeling-off of shrimp is carried out for every tail in a case of shrimp consumed in a large amount. If the number of shell peeling-off runs per tail of shrimp is large, the labor required for the shell peeling-off is increased, and a lot of time is required. For this reason, when the abdominal segment side carapaces are peeled off for a large amount of shrimps, the five abdominal segment side carapaces of the first to fifth abdominal or ventral segments are peeled off by three runs of the peeling-off operation, with the abdominal segment side carapace of the sixth abdominal segment left without being peeled off. In this case, however, to peel off the respective abdominal segment side carapaces of the first to fifth abdominal segments, it is common that a time of about 10 seconds is spent even by one skilled in the art for peeling off the respective abdominal segment-side carapaces of the first to fifth abdominal segments. A considerably long time is spent for the shell peeling-off operation for the shrimps consumed in a large amount, which comes into question.

When the shrimp is fried in an oil, outer ones of tail limbs of the tail segment must be removed or cut in order to prevent the bursting of the tail segment, resulting in one more operation, e.g., a time of five seconds required. Even in this case, a total four runs of the operation is required, e.g., a time of about 15 seconds is required for peeling-off a tail of shrimp and hence, a considerably long time is spent for the shell peeling-off operation for shrimps consumed in a large amount. Therefore, it is demanded to achieve the shell peeling-off of the shell at each abdominal segment of a shrimp in a short time.

Moreover, when the abdominal segment side carapace of the sixth abdominal segment is left without being peeled off, the sixth abdominal segment portion is in a state with the abdominal segment side carapace affixed thereto, and is difficult to eat. For this reason, it is common that the sixth abdominal segment portion is not used as an edible portion and discarded. Therefore, the edible portion of the shrimp is decreased by about 5 to 10 percent by weight, which is a problem.

To facilitate the peeling-off of each of the abdominal segment side carapaces of the shrimp, it is a conventional practice to make cuts in a back of each of the abdominal segment side carapaces of the shrimp. However, if the cuts are made in the back, they are conspicuous, resulting in a degraded external appearance. In addition, even if the cuts are made in the back, the time required for peeling off each of the abdominal segment side carapaces is little different from that when no cut is made, and the cuts in the back of each abdominal segment side carapace do not effectively act on the peeling-off of each abdominal segment-side carapace. Moreover, in this case, the abdominal segment side carapace of the sixth abdominal segment and the outer tail limbs of the tail segment remain left without being peeled off and hence, it is impossible to avoid the decrease in edible portion of the shrimp, which is a problem.

There is also a processed product of shrimp made by peeling off five abdominal segment side carapaces of the first to fifth abdominal segments of the shrimp, so that the shrimp product can be eaten immediately after being cooked. However, this processed shrimp product assumes from a problem that the flavor thereof is lowered, as compared with a shelled shrimp. Moreover, the processed product of shrimp suffers from a problem that even if the abdominal segment side carapace of the sixth abdominal segment remain left, the surface area of the side surface is reduced by 15 to 25 percent, because the abdominal segment-side carapaces of the first to fifth abdominal segments of the shrimp have been peeled off, resulting in an injured external appearance and a reduced commercial value of the shrimp product.

The present invention aims at solving the problems concerning the peeling-off of the abdominal segment side carapaces as the outer shell of the shrimp. Accordingly, it is an object of the present invention to provide an edible shrimp product, wherein abdominal segment-side carapaces of first to sixth abdominal or ventral segments of the shrimp product can be completely peeled by one run of a simple operation in a time far short from a time required for peeling-off the abdominal segment-side carapaces in the prior art, e.g., in a time which is one third of the time in the prior art, without injuring of the external appearance, and the first to sixth abdominal segments can be eaten.

DISCLOSURE OF THE INVENTION

According to the present invention, there is provided an edible shrimp product, wherein each of abdominal carapaces interconnecting opposite ends of each of abdominal segment side carapaces of first to fifth abdominal or ventral segments of a shrimp is cut with at least one cut in order to simply peel off each of the abdominal segment side carapaces of the first to sixth abdominal segments of the shrimp in a short time, and at least a portion of the abdominal carapace connecting the opposite ends of the abdominal segment side carapace of the sixth abdominal segment is cut with at least one cut.

In addition, according to the present invention, there is provided an edible frozen shrimp product, wherein each of the abdominal carapaces interconnecting opposite ends of each of the abdominal segment side carapaces of first to fifth abdominal segments of a shrimp is cut with at least one cut in order to simply peel off each of the abdominal segment side carapaces of the first to sixth abdominal segments of the preserved shrimp in a short time; at least a portion of the abdominal carapace interconnecting the opposite ends of the sixth abdominal segment is cut with at least one cut, and the entire shrimp product is frozen.

Further, according to the present invention, there is provided a process for preparing an edible shrimp product with the shell peeled off, comprising the steps of cutting, by an edged tool, each of abdominal carapaces interconnecting opposite ends of each of abdominal segment side carapaces of first to fifth abdominal segments of a shrimp in order to simply peel off each of the abdominal segment-side carapaces of the first to sixth abdominal segments of the shrimp; cutting at least a portion of the abdominal carapace interconnecting the opposite ends of the sixth abdominal segment; and tearing off a tail segment of the shrimp with the abdominal carapaces cut from the tail limbs toward the first abdominal segment.

In the present invention, in order to simply peel off the abdominal segment side carapace of each of the first to sixth abdominal segment, the cuts are made in the abdominal carapaces of the first to sixth abdominal segments in such a manner that the abdominal carapace of the film-like outer shell interconnecting the opposed opposite ends of the side carapace is cut on the abdomen side of each of the first to fifth abdominal segments of the shrimp, and the abdominal carapace of the film-like outer shell interconnecting the opposed opposite ends is cut over one half or more toward the tail segment on the abdomen side of the sixth abdominal segment. In this manner, the abdominal segment side carapaces of the first to sixth abdominal segments of the shrimp can be peeled off from the body at one time by tearing them off, for example, with the tail segment and tail limbs held separately by hand, by the fact that the cuts are previously made in the abdominal carapaces of the abdominal segments of the shrimp in order to cut away the opposite ends of the side carapace of each of the abdominal segments of the shrimp.

In the present invention, the cuts for severing the ends of each of the abdominal segment side carapaces of the shrimp from each other are made to cut the abdominal carapaces from the first abdominal segment side carapace toward the sixth abdominal segment side carapace. The abdominal carapace may be cut at any place therein. For example, one or more cuts are continuously provided over the entire length for a soft film-like or sheet-like shell abdominal carapace between every pair of abdominal limbs located at each of the abdominal segments of the first to fifth abdominal segments of the shrimp within a region surrounded by a line connecting positions outwards spaced apart from every pair of abdominal limbs by 5 mm. Further, for the abdominal carapace of the sixth abdominal segment, the cuts are continuously provided over a portion a length of between from the head breast side to the tail segment, or over one half of a length between the head breast and the tail segment, or over such entire length. The continuous cuts cause the left and right ends of each of the abdominal segment side carapaces of the first and sixth abdominal segments to be severed from each other, and facilitate the peeling-off of the abdominal segment side carapaces of the first to sixth abdominal segments at one time, for example, by tearing-off the tail segment and the tail limbs with both of them held by hand. However, if the cuts provided in the sixth abdominal segment are provided to reach the tail segment or the tail limbs, the peeling-off of the abdominal segment side carapaces are more facilitated and hence, the provision of such cuts is preferred.

In the present invention, cuts may be provided in side carapace of the outer shell at the fifth or sixth abdominal segment. In this case, the cuts can be made obliquely in the abdominal carapace and the side carapace from the fifth or sixth abdominal segment toward the tail segment or the tail limbs, preferably, toward the tail limbs, continuously from the cuts already provided in the abdominal carapaces. Even in this case, the side carapaces extending from the first abdominal segment to the sixth abdominal segment, i.e., the abdominal side carapaces can be peeled off by one run of the operation from the body portion by tearing off the tail limbs and the tail segment with both of them held by hand, as in the case where the abdominal segment side carapace of the sixth abdominal segment is cut. In the present invention, as described above, the cuts are previously made in the abdominal carapace of each of the first to sixth abdominal segments of the shrimp, so that the connection between the opposed opposite ends (on the side of abdominal segment) of each of the first to sixth abdominal segments of the shrimp, or the cuts are previously made in the abdominal segment side carapace or the abdominal carapace between the sixth abdominal segment and the tail segment. Thus, unlike the prior art, the tearing-off of the abdominal segment side carapaces of the first to sixth abdominal segments of the shrimp can be achieved at one run of the operation by pulling the tail limbs and the tail segment away from each other with both of them held by hand, thereby achieving the peeling-off of the shell of the shrimp in a short time.

It is preferable that the cuts are made in the abdominal carapaces of the first to sixth abdominal segments by scissors, because this is achieved by a simple and easy cut making operation. In this case, the abdominal carapaces of the outer shell on the abdomen side of the shrimp are cut, and the body meat on the abdomen side is cut. However, if the body meat is cut over one half of the thickness of the meat of the back side from the abdomen side, it is not preferable, because the body meat is easy to open, resulting in a lowered commercial value of the shrimp product. The cutting of the body meat in the present invention is carried out along with the cutting the abdominal carapaces, but it is preferable that the body meat is cut in a small amount. Therefore, it is preferable that the cutting of the body meat is conducted over one half or less, or smaller than one half or one third of the thickness of the back-side body portion from the abdomen side of the body meat.

In the present invention, the cuts are previously provided in the abdominal segment side carapaces or the abdominal carapaces of the first to sixth abdominal segments of the shrimp. Therefore, if the tail segment and the four tail limbs are pulled in opposite directions, the abdominal segment side carapaces and the abdominal carapaces of the outer shell on the first to sixth abdominal segment and the outer shell portions on the abdominal limbs and the tail segment of the shrimp can be completely removed in a short time of, for example, 5 seconds and by one run of the simple operation, thereby simply and easily providing only the body meat and the tail limbs.

The present invention will now be described by way of embodiments, and is not limited in any way to the following illustration and description of the embodiment.

BEST MODE FOR CARRYING THE PREFERRED EMBODIMENTS

Figure 6:
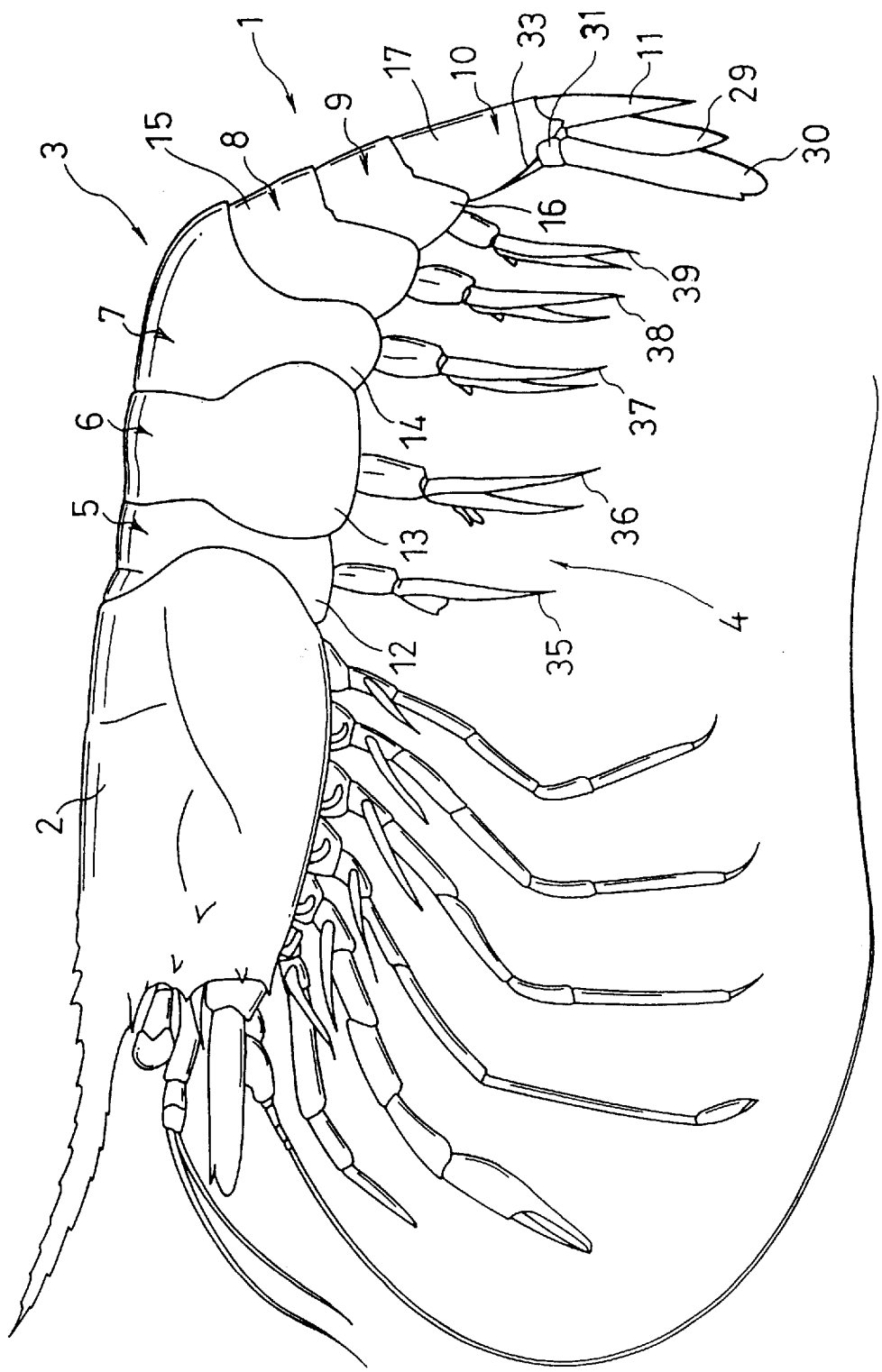
FIG. 6 is a side view of the shrimp of the embodiment shown in FIG. 5, having a head breast portion and the cuts made in the abdominal carapaces and the side carapaces.

As shown in FIG. 6, the head portion and the breast portion of a shrimp 1 are covered with a head breast carapace 2 and connected to an outer shell 3 on an abdomen portion. The abdomen 4 comprised of seven segments comprises a first abdominal segment 5, a second abdominal segment 6, a third abdominal segment 7, a fourth abdominal segment 8, a fifth abdominal segment 9 and a sixth abdominal segment 10, as well as a tail segment 11. These segments are covered with the carapaces, i.e., the outer shell. The first abdominal segment 5 is covered with a first abdominal segment side carapace 12 of the outer shell; the second abdominal segment 6 is covered with a second abdominal segment side carapace 13 of the outer shell; the third abdominal segment 7 is covered with a third abdominal segment side carapace 14 of the outer shell; the fourth bdominal segment 8 is covered with a fourth abdominal segment side carapace 15 of the outer shell; the fifth abdominal segment 9 is covered with a fifth abdominal segment side carapace 16 of the outer shell; and the sixth abdominal segment 10 is covered with a sixth abdominal segment side carapace 17 of the outer shell. The tail segment 11 is located adjacent the sixth abdominal segment 10 and covered with a tail segment side carapace 18 of the outer shell. (FIG. 4)

Figure 2:
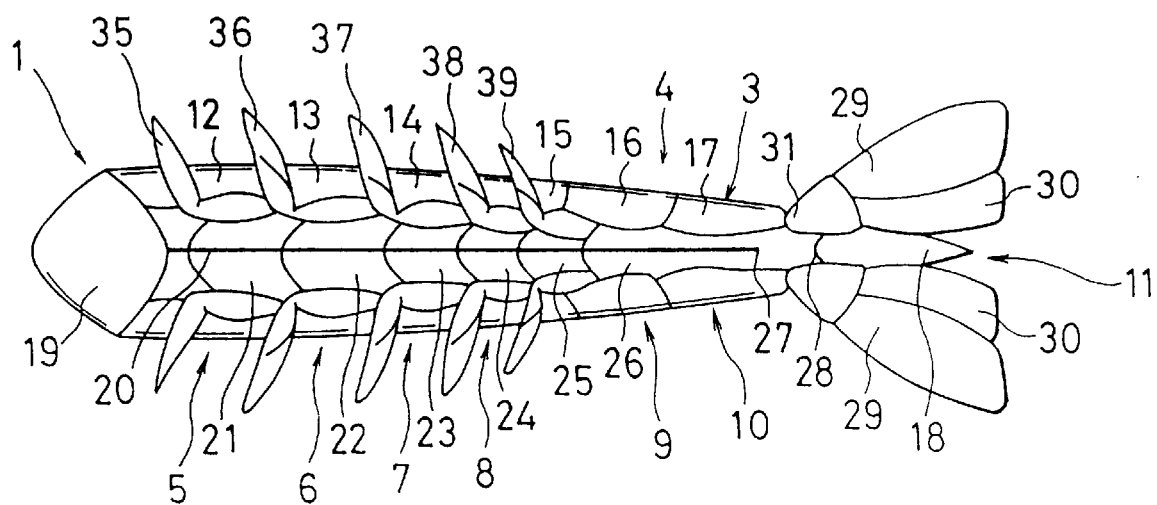
FIG. 2 is a view illustrating another embodiment of the present invention different from the embodiment shown in FIG. 1, wherein for convenience, a shrimp with a head breast portion removed therefrom is shown on its back. The shrimp has a cut made in abdominal carapaces in a form different from that in the embodiment shown in FIG. 1.
Figure 3:
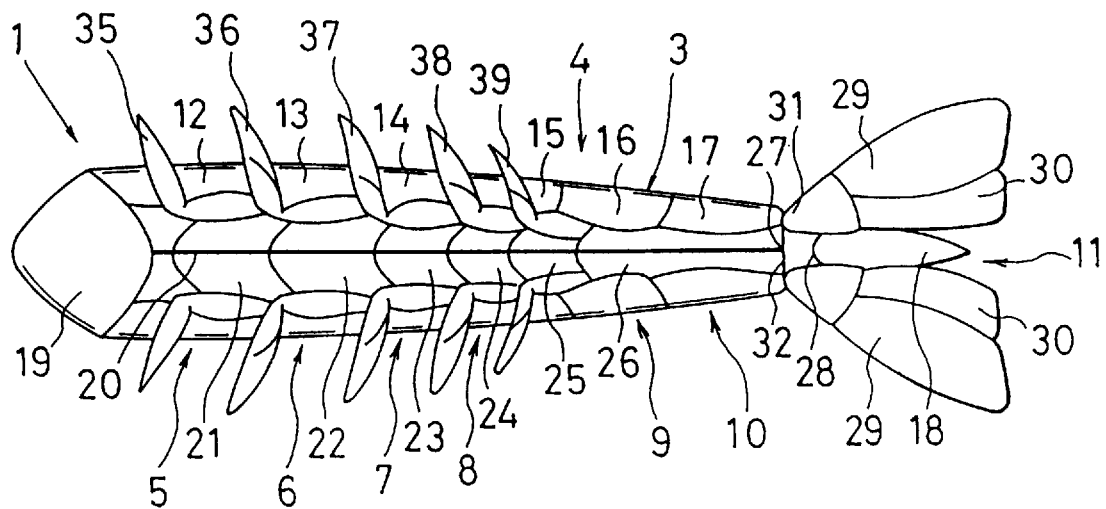
FIG. 3 is a view illustrating a further embodiment of the present invention different from the embodiment shown in FIG. 2, wherein for convenience, a shrimp with a head breast portion removed therefrom is shown on its back. The shrimp has a cut made in abdominal carapaces in a form different from those in the embodiments shown in FIGS. 1 and 2, and further has a cut made in side carapaces.
Figure 4:
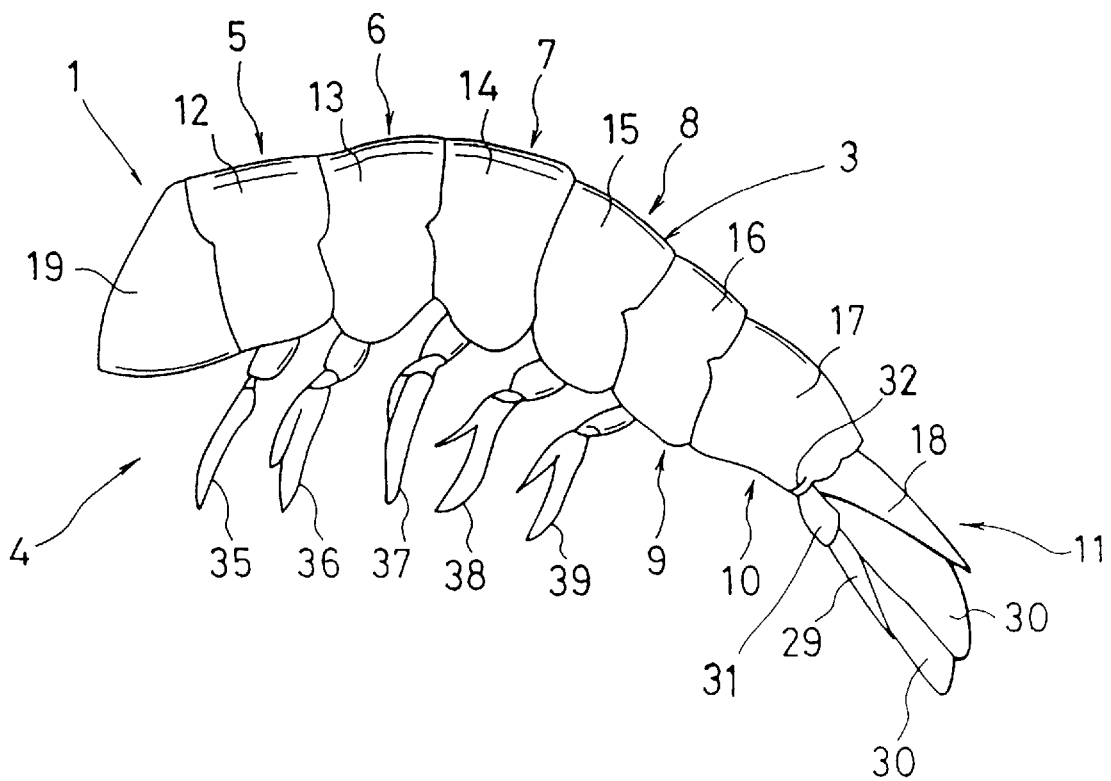
FIG. 4 is a side view of a shrimp having cuts made in a form different from that in FIG. 3 in abdominal carapaces and side carapaces according to an embodiment different from the embodiment shown in FIG. 3 (the cut in the side carapace is shown).

The operation of peeling-off of the shell of the shrimp is to separate the first abdominal segment side carapace 12 on the first abdominal segment 5, the second abdominal segment side carapace 13 on the second abdominal segment 6, the third abdominal segment side carapace 14 on the third abdominal segment 7, the fourth abdominal segment side carapace 15 on the fourth abdominal segment 8, the fifth abdominal segment side carapace 16 on the fifth abdominal segment 9, the sixth abdominal segment side carapace 17 on the sixth abdominal segment 10 and the tail segment side carapace 18 on the tail segment 11 from a body portion 19 (see FIGS. 2, 3 and 4).

Figure 1:
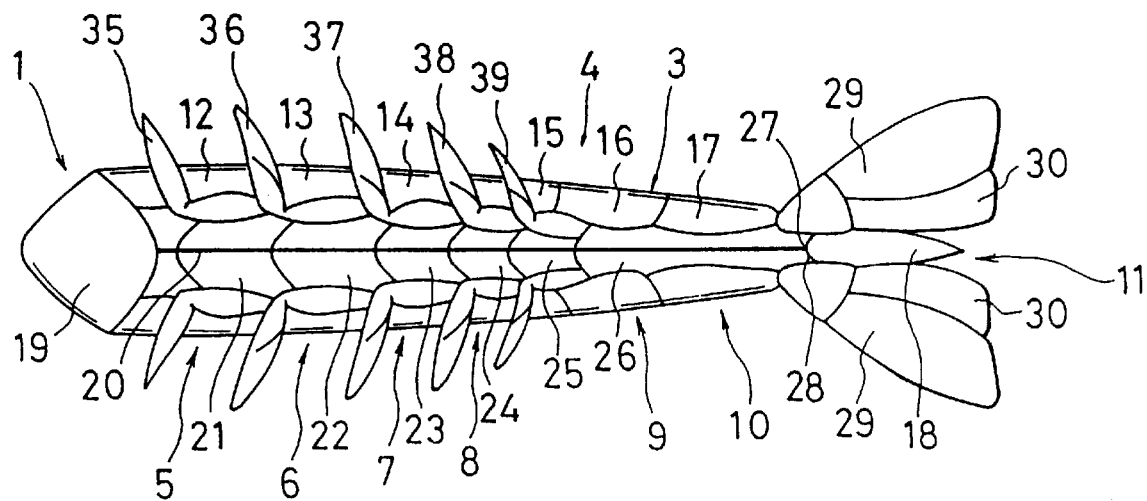
FIG. 1 is a view illustrating an embodiment of the present invention, wherein for convenience, a shrimp with a head breast portion removed therefrom is shown on its back. The shrimp has a cut made to extend from an abdominal carapace of a first abdominal segment to a tail segment.

In an embodiment shown in FIG. 1, a cutting which cuts the abdominal carapaces to make a cut 20 is applied to the carapaces (abdominal carapaces) of the outer shell on the abdomen side, which are soft as compared with the carapaces (side carapaces) of the outer shell on the back side of the shrimp 1. This cut 20 (see FIGS. 1 to 3, 5, 7 and 8) is made to extend through a first abdominal carapace 21 corresponding to the first abdominal segment 5, a second abdominal carapace 22 corresponding to the second abdominal segment 6, a third abdominal carapace 23 corresponding to the third abdominal segment 7, a fourth abdominal carapace 24 corresponding to the fourth abdominal segment 8, a fifth abdominal carapace 25 corresponding to the fifth abdominal segment 9 and a sixth abdominal carapace 26 corresponding to the sixth abdominal segment 10. An end 27 of the cut 20 reaches an end 28 of the tail segment 11.

The cut 20 is made by cutting the first to sixth abdominal carapaces 21 to 26 sequentially, for example, from a point where a body meat 19 is exposed, by scissors, in a manner that the cutting is stopped when the end 27 of the cut 20 reaches the end 28 of the tail segment 11.

For the shrimp 1 having the cut 20 made continuously from the first abdominal carapace 21 to the end 28 of the tail segment 11 in the above manner, the first to sixth side carapaces 12 to 17 can be easily pulled away simultaneously from the body meat 19 by one run of a pulling-away operation along with the first to sixth abdominal carapaces 21 to 26 by tearing off the shrimp from the side of the tail segment 11 with the tail segment 11 held by one hand and with outer or inner ones 29 or 30, or outer and inner ones 29 and 30 of tail limbs held by the other hand. In the above manner, according to this embodiment, a time of about 5 seconds suffices to peel off the outer shell of one tail of shrimp.

In an embodiment shown in FIG. 2, an end 27 of a cut 20 is terminated at a point beyond one half of the length of the abdominal carapace 26 of the sixth abdominal segment, and this cut 20 is short, as compared with the cut 20 in FIG. 1. Even if the cut 20 does not reach the end 28 of the tail segment 11, the first to sixth side carapaces 12 to 17 of the shrimp having the cut 20 made in the same manner as in the embodiment shown in FIG. 1 to extend to the point beyond one half of the length of the sixth abdominal carapace 26 of the sixth abdominal segment toward the abdominal segment can be easily pulled away simultaneously from the body meat 19 by one run of a pulling-away operation along with the first to sixth abdominal carapaces 21 to 26 by tearing off the shell of the shrimp from the side of the tail segment 11 with the tail segment 11 held by one hand and with outer or inner ones 29 or 30, or outer and inner ones 29 and 30 of the tail limbs held by the other hand. In the above manner, according to this embodiment, a time of about 5 seconds suffices to peel off the outer shell of one tail of shrimp.

In the embodiment shown in FIG. 2, the cut 20 is made by sequentially cutting the first to fifth abdominal carapaces 21 to 26 from the point where the body meat 19 is exposed, by the scissors, as in the embodiment shown in FIG. 1. In the sixth abdominal carapace 26, the cut 20 is made to extend at a length which is more than one half of the length of the sixth abdominal carapace 26 toward the abdominal segment.

When the cut 20 is made in the sixth abdominal carapace 26, the sixth abdominal carapace 26 can be cut to a line interconnecting ends of roots 31 of both abdominal limbs. In this case, a terminal position to which the sixth abdominal carapace is cut is definitely defined, which is preferable.

In an embodiment shown in FIG. 3, an end 27 of a cut 20 is terminated at a point on a line interconnecting roots 31 of the tail limbs. In this embodiment, another cut 32 is further made intersecting the cut 20 at substantially right angles to extend to the roots 31 or upper ends of the roots 31.

In this embodiment, the cut 20 is first made by sequentially cutting the first to fifth abdominal carapaces 21 to 25, for example, from a point where the body meat 19 is exposed, by scissors, as in the embodiment shown in FIG. 1, and then, cutting the sixth abdominal carapace 26 to the location on the line interconnecting the roots 31 of the both abdominal limbs. The other auxiliary cut 32 is made by cutting the abdominal carapace 26 and the side carapace 17 on opposite sides of the cut 20, so that the cut 32 is connected to the end 27 of the cut 20 at right angles.

FIG. 4 shows a side view of a shrimp having a cut 32 in a form different from that in FIG. 3, according to an embodiment different from the embodiment shown in FIG. 3. In this embodiment, the cut 32 is made at a short length in the sixth abdominal carapace, as compared with the length in FIG. 3. In FIG. 4, the cut 32 is made to extend toward the back to the extent not beyond an upper end of the roots 31 of the tail limbs on the side of the back.

In the embodiments shown in FIGS. 3 and 4, the cuts are comprised of the cut 20 and the cut 32 different from the cut 20. For the shrimps having the cuts made in the above manner, the outer shell can be more reliably and easily peeled off than for the shrimps in the embodiments shown in FIGS. 1 and 2.

More specifically, for the shrimps having the cuts made in the above manner, the first to sixth side carapaces 12 to 17 can be easily pulled away simultaneously from the body meat 19 by one run of the pulling-away operation along with the first to sixth abdominal carapaces 21 to 26 and the tail segment 11 by tearing off the shrimp with the tail segment 11 held by one hand with outer or inner ones, or outer and inner of the tail limbs held by the other hand. In the above manner, according to this embodiment, a time of about 5 seconds suffices to peel off the outer shell of one tail of shrimp.

In the embodiments shown in FIGS. 3 and 4, the cut 32 is made to extend to the cut 20 toward the sixth side carapace 26, but the cut 32 may be made to extend from the cut 20 toward the vicinity of the roots 31 of the tail limbs. In this case, it is preferable that the cut 32 is made from the end 27 of the cut 20 in the sixth abdominal carapace 26, but the cut 32 may be made from the end 27 of the cut 20 in the fifth abdominal carapace 25.

Figure 5:
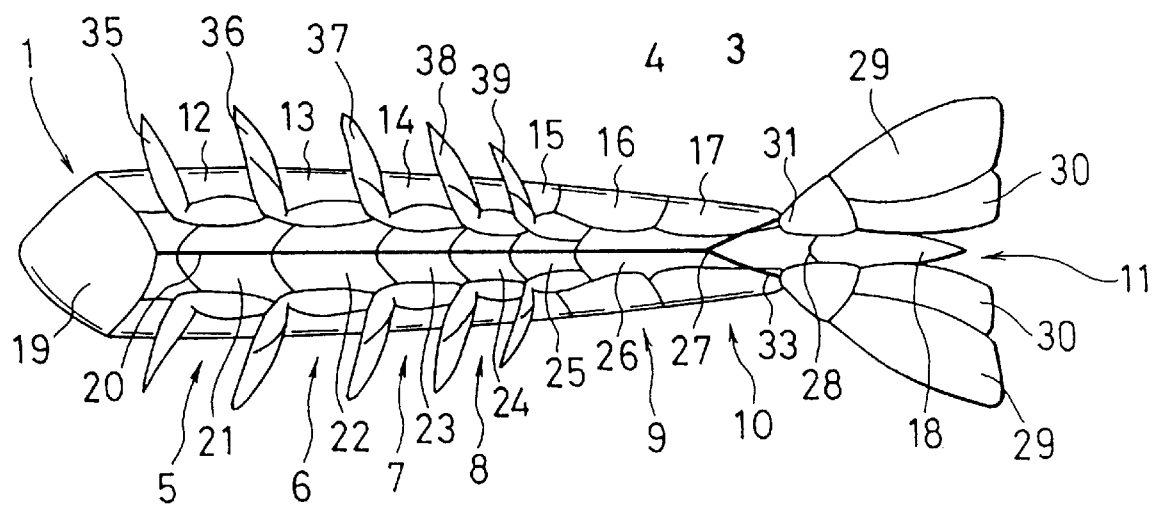
FIG. 5 is a view illustrating a further embodiment of the present invention different from the embodiment shown in FIG. 4, wherein for convenience, a shrimp with a head breast portion removed therefrom is shown on its back. The shrimp has cuts made in abdominal carapaces and side carapaces in a form different from those in the embodiments shown in FIGS. 3 and 4.

In an embodiment shown in FIG. 5, an end 27 of a cut 20 in the sixth abdominal carapace 26 is terminated at a point considerably spaced apart from the roots 31 of the tail limbs. In this embodiment, other cuts 33 are further made to extend toward the roots 31 of the tail limbs and inclined at an acute angle from the end 27 of the cut 20 toward the roots 31 of the tail limbs.

In this embodiment, the cut 20 is first made by sequentially cutting the first to fifth abdominal carapaces 21 to 25, for example, from a point where the body meat 19 is exposed, and further cutting the sixth abdominal carapace 26 to a suitable point corresponding to one half or more of the length of the sixth abdominal carapace. Then, the other cuts 33 are made by cutting the abdominal carapace 26 and the side carapace 17 from the end 27 of the cut 20 toward the roots 31 of the tail limbs or the vicinity thereof.

FIG. 6 shows the shrimp particularly having the head breast portion in a side view according to the embodiment shown in FIG. 5, wherein the other cuts 33 made to extend toward the roots 31 of the tail limbs are shown.

In the embodiments shown in FIGS. 5 and 6, the cuts are comprised of the cut 20 and the cut 33 different from the cut 20. For the shrimps having the cuts made in the above manner, the outer shell can be more reliably and easily peeled off than for the shrimps in the embodiments shown in FIGS. 1 and 2.

More specifically, for the shrimps having the cuts made in the above manner, the first to sixth side carapaces 12 to 17 can be easily pulled away simultaneously from the body meat 19 by one run of the pulling-away operation along with the first to sixth abdominal carapaces 21 to 26 and the tail segment 11 by tearing off the shrimp from the side of the tail segment 11 with the tail segment 11 held by one hand with outer or inner ones, or outer and inner of the tail limbs held by the other hand. In the above manner, according to this embodiment, a time of about 5 seconds suffices to peel off the outer shell of one tail of shrimp.

In the embodiments shown in FIGS. 5 and 6, the cuts 33 are made to extend from the cut 20 toward roots 31 of the tail limbs, but the cut 33 may be made to extend from the cut 20 toward the vicinity of the roots 31 of the tail limbs. In this case, it is preferable that the cuts 33 are made from the end 27 of the cut 20 in the sixth abdominal carapace 26, but the cuts 33 may be made from the end 27 of the cut 20 in the fifth abdominal carapace 25.

Figure 7:
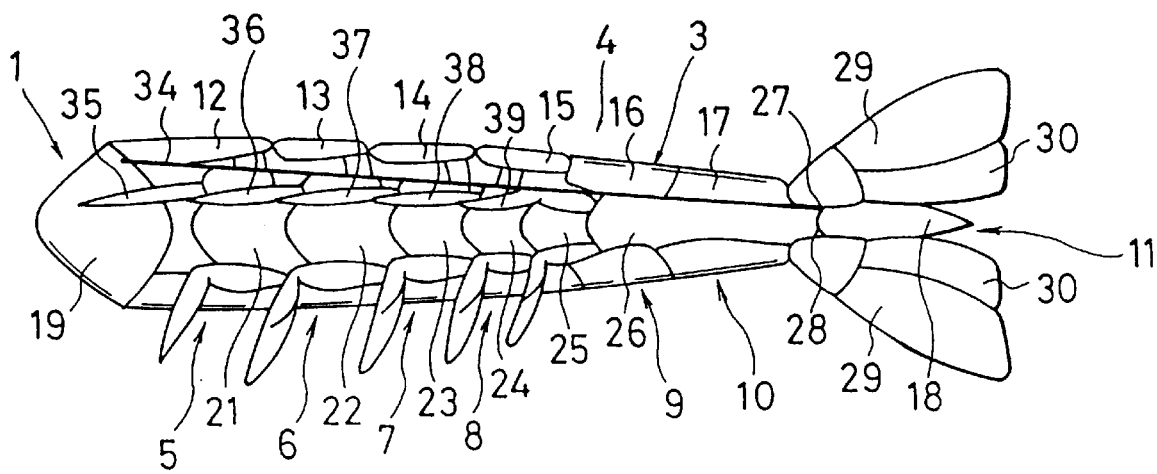
FIG. 7 is a view illustrating a further embodiment of the present invention different from the embodiments shown in FIGS. 1 to 6, wherein for convenience, a shrimp with a head breast portion removed therefrom is shown on its back. The shrimp has a cut made in abdominal carapaces in a form different from those in the embodiments shown in FIGS. 1 to 6.

In an embodiment shown in FIG. 7, a cut 34 cut through from the first to sixth abdominal carapaces is made in those ends (on the side of side carapaces) of the first to sixth abdominal carapaces 21 to 26, which are each outside a pair of abdominal limbs (35 to 39) on each of the abdominal segments (5 to 10). On the contrast, in the embodiments shown in FIGS. 1 to 6, the cut 20 is made between a pair of first abdominal limbs 35, second abdominal limbs 36, third abdominal limbs 37, fourth abdominal limbs 38 and fifth abdominal limbs 39 formed on first to fifth abdominal segments. Therefore, the embodiment shown in FIG. 7 is different from the embodiments shown in FIGS. 1 to 6 in respect of the position of the cut made in the abdominal carapaces.

In this embodiment, the end 27 of the cut 34 reaches the end 28 of the tail segment 11, as shown in FIG. 7. Therefore, as is the cut 20 in the embodiment shown in FIG. 1, the cut 20 is made by cutting the first to sixth abdominal carapaces 21 to 26 at the position outside the abdominal limbs on the side where the body meat 19 is exposed, by scissors, until the cut 20 reaches the end 28 of the tail segment 11.

For the shrimp having the cut 34 made therein, as in the shrimps in the embodiments shown in FIGS. 3 to 6, even if the cut 20 as shown in FIG. 7 is made at the position near the ends of the abdominal carapaces on the side carapaces, the first to sixth side carapaces 12 to 17 can be easily pulled away simultaneously from the body meat 19 by one run of the pulling-away operation along with the first to sixth abdominal carapaces 21 to 26 by tearing off the shrimp from the tail segment 11 with the tail segment 11 held by one hand and with the outer or inner ones 29 or 30 or outer and inner ones 29 and 30 of the tail limbs held by the other hand. In the above manner, according to this embodiment, a time of about 5 seconds suffices to peel off the outer shell of one tail of shrimp.

Figure 8:
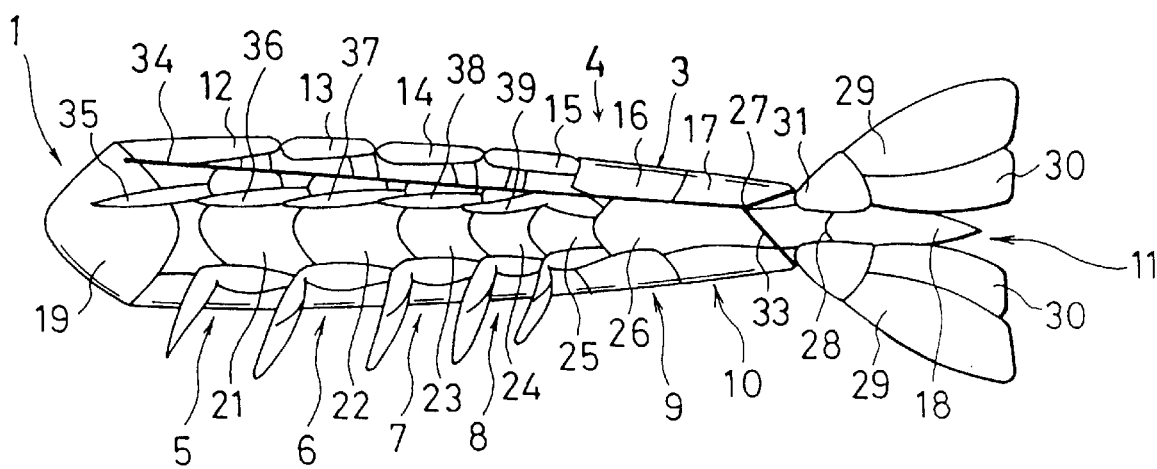
FIG. 8 is a view illustrating a further embodiment of the present invention different from the embodiments shown in FIGS. 1 to 7, wherein for convenience, a shrimp with a head breast portion removed therefrom is shown on its back. The shrimp has a cut made in abdominal carapaces in a form different from those in the embodiments shown in FIGS. 1 to 6, and further has cuts made in side carapaces.

An embodiment shown in FIG. 8 is different from the embodiments shown in FIGS. 5 and 6 in that a cut 34 cutting the first to sixth abdominal carapaces is made in those ends of the first to sixth abdominal carapaces 21 to 26, which are each outside a pair of abdominal limbs on each of the abdominal segments (5 to 10).

In the embodiment shown in FIG. 8, an end 27 of the cut 34 is terminated at a point which is far spaced apart from the roots 31 of the tail limbs 11, but in this embodiment, other cuts 33 are made to extend toward the roots 31 of the tail limbs and inclined at an acute angle from the end 27 of the cut 34 toward the tail segment 11 or the tail limbs 29 and 30.

In this embodiment, the cut 33 is made to extend from the cut 34 toward the roots 31 of the tail limbs, but the cut 33 may be made to extend from the cut 34 toward the vicinity of the roots 31 of the tail limbs. In this case, it is preferable that the cut is made from the end 27 of the cut 34 in the sixth abdominal carapace 26, but may be made from the end 27 of the cut 34 in the fifth abdominal carapace.

In this embodiment, the cut 34 is made by first cutting the first to fifth abdominal carapaces 21 to 25 sequentially by scissors, for example, from a point where the body meat 19 is exposed and then cutting the sixth abdominal carapace 26 to a suitable point. Then, the inclines cuts 33 are made by cutting the abdominal carapace 26 and the opposite side carapaces 17 from the end 27 of the cut 34 toward the roots 31 of the tail limbs on the opposite sides.

In the embodiment shown in FIG. 8, the cuts are formed from the cut 34 and the cuts 33 different from the cut 33 in FIGS 4 and 5. For the shrimp having the cuts made in the above manner, the peeling-off of the outer shell is achieved more reliably and easily than that of the shrimp in the embodiment shown in FIG. 7.

More specifically, for the shrimp having the cuts formed from the cut 34 and the other cuts 33 as shown in FIG. 8, the first to sixth side carapaces 12 to 17 can be easily pulled away simultaneously from the body meat 19 by one run of the pulling-away operation along with the first to sixth abdominal carapaces 21 to 26 by tearing off the shrimp from the side of the tail segment 11 with the tail segment 11 held by one hand with outer or inner ones 29 or 30, or outer and inner ones 29 and 30 of the tail limbs held by the other hand. In the above manner, according to this embodiment, a time of about 5 seconds suffices to peel off the outer shell of one tail of shrimp.

Industrial Applicability

In the present invention, the outer shell of one tail of shrimp can be completely removed in a time of about 5 seconds by one run of the simple operation. Therefore, as compared with the prior art peeling-off process requiring a time of about 15 seconds for peeling off the outer shell of the shrimp by four runs of the operation, while leaving the outer shell portion on the sixth abdominal segment, the time taken per tail of shrimp can be shortened considerably, i.e., to one third of the time taken in the prior art process, and moreover, no outer shell portion is left unpeeled.

In the present invention, the outer shell portion on the tail segment is removed along with the side carapaces and the abdominal carapaces on the abdominal segment, i.e., simultaneously with the outer shell portions on the other abdominal segments by one run of the operation. To remove the carapace on the tail segment, no special operation is required. For the shrimp product dressed with the outer shell remaining affixed thereto according to the present invention, the operation is simple, as compared with the prior art shrimp product made by peeling off the outer shell by three runs of a manual operation using a bare hand. Therefore, the outer shell portions on all the first to sixth abdominal segments as well as the tail segment can be easily peeled off by one run of the operation without use of a bare hand, for example, by holding the tail limbs and lifting the tail segment by a fork.

According to the present invention, the cut cutting the abdominal carapaces on the first to sixth abdominal segments severs the body meat at a thickness of one half or less and hence, the abdomen of the shrimp is not opened, and the shrimp assumes an external appearance just as the abdomen is not cut. Therefore, the commercial value of the shrimp product cannot be reduced. Moreover, the peeling-off of the shell of the shrimp can be performed quickly and hence, the shrimp product is suitable for use in a food served in a pot.

Further, in the present invention, the outer shell portion and the side carapace on the sixth abdominal segment are also simultaneously removed and hence, even that meat portion in the sixth abdominal segment area which is discarded because it is difficult to eat and which occupies 5 to 10 percent based on the entire meat, can be eaten.

The edible shrimp product according to the present invention need not be dressed into a processed product of shrimp with the outer shell peeled off as in the prior art, because the outer shell, i.e., the side carapaces on the abdominal segments can be simply peeled off by one run of the operation. In addition, because the outer shell remains affixed to the shrimp, the flavor is maintained; the side area reduced by 15 to 25 percent in the prior art is not reduced at all; and the external appearance is not injured at all and hence, the commercial value of the shrimp product is not reduced.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. An edible shrimp product made from shrimp, each shrimp having first through sixth abdominal segments extending from the head to the tail of the shrimp, respectively, the tail having tail limbs, wherein each of abdominal carapaces interconnecting opposite ends of each of abdominal segment side carapaces of the first to fifth abdominal segments is cut along its entire length with a continuous cut;

at least a portion of the abdominal carapace interconnecting the opposite ends of the abdominal segment side carapace of the sixth abdominal segment is cut with a connecting cut connected with the continuous cut; and the side carapace of the sixth abdominal segment is cut with a side cut intersecting the connecting cut in the abdominal carapace of the sixth abdominal segment, the side cut being made in a region reaching the upper ends of roots of the tail limbs within the side carapace of the sixth abdominal segment.

2. An edible shrimp product made from shrimp, each shrimp having first through sixth abdominal segments extending from the head to the tail of the shrimp, respectively, the tail having tail limbs, wherein each of abdominal carapaces interconnecting opposite ends of each of abdominal segment side carapaces of first to fifth abdominal segments is cut along its entire length with a continuous cut;

at least a portion of the abdominal carapace interconnecting the opposite ends of the abdominal segment side carapace of the sixth abdominal segment is cut with a connecting cut connected with the continuous cut; and the entire shrimp is frozen.

3. An edible shrimp product according to claim 2, wherein the connecting cut is approximately one half of the length of the sixth abdominal carapace.

4. An edible shrimp product according to claim 2, wherein the abdominal carapaces of the sixth abdominal segments is cut over its entire length by the continuous cut.

5. An edible shrimp product according to claim 2, wherein the continuous cut cutting the abdominal carapaces of the first to sixth abdominal segments cuts the body meat of the shrimp at a thickness one half of the thickness of the body meat along with the abdominal carapaces.

6. A process for preparing an edible shrimp product made from shrimp, each shrimp having first through sixth abdominal segments extending from the head to the tail of the shrimp, respectively, the tail having tail limbs, the process comprising the steps of:

cutting along an entire length thereof each of abdominal carapaces interconnecting opposite ends of each of abdominal segment side carapaces of the first to fifth abdominal segments;

cutting a least a portion of the abdominal carapace interconnecting the opposite ends of the segment side carapace of the sixth abdominal segment to connect with the cut formed by cutting each of the abdominal carapaces;

tearing off the tail segment of the shrimp with the abdominal carapaces cut, from the tail limbs toward the first abdominal segment.

* * * * *